United States Patent
Larsson et al.

(10) Patent No.: US 10,271,297 B2
(45) Date of Patent: Apr. 23, 2019

(54) METHOD FOR OPERATING A CELLULAR RADIO NETWORK

(71) Applicant: Sony Corporation, Tokyo (JP)

(72) Inventors: Bo Larsson, Malmö (SE); Lars Nord, Lund (SE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/030,938

(22) PCT Filed: Oct. 17, 2014

(86) PCT No.: PCT/IB2014/065404
§ 371 (c)(1),
(2) Date: Apr. 21, 2016

(87) PCT Pub. No.: WO2015/071793
PCT Pub. Date: May 21, 2015

(65) Prior Publication Data
US 2016/0278038 A1    Sep. 22, 2016

(30) Foreign Application Priority Data
Nov. 18, 2013 (EP) .................................... 13193308

(51) Int. Cl.
*H04W 60/04*    (2009.01)
*H04W 64/00*    (2009.01)

(52) U.S. Cl.
CPC ......... *H04W 60/04* (2013.01); *H04W 64/006* (2013.01)

(58) Field of Classification Search
CPC .... H04L 67/18; H04W 36/32; H04W 64/006; H04W 60/04
See application file for complete search history.

(56) References Cited

U.S. PATENT DOCUMENTS

| 8,718,934 B1 * | 5/2014 | Erdmann | G01C 21/3617 |
| | | | 701/465 |
| 9,277,365 B1 * | 3/2016 | Wilden | H04W 4/028 |
| 2008/0117884 A1 * | 5/2008 | Ishii | H04W 12/06 |
| | | | 370/338 |
| 2009/0291672 A1 * | 11/2009 | Treves | G06F 17/3087 |
| | | | 455/414.1 |

(Continued)

FOREIGN PATENT DOCUMENTS

| EP | 1713292 A1 | 10/2006 |
| EP | 2615857 | 7/2013 |
| WO | 01/58182 A2 | 8/2001 |

OTHER PUBLICATIONS

International Search Report and Written Opinion from corresponding International Patent Application No. PCT/IB2014/065404, dated Feb. 25, 2015.

*Primary Examiner* — Timothy Pham
(74) *Attorney, Agent, or Firm* — Tucker Ellis LLP

(57) ABSTRACT

The present invention relates to a method for operating a cellular radio network (100). According to the method, a predicted location information (203) relating to a user equipment (110) is determined. The predicted location information (203) comprises a predicted future location of the user equipment (110). Depending on the predicted location information (203) control information is determined. Based on the control information, a registering of the user equipment (110) at cells (101, 101A-101H) of the cellular radio network (100) is controlled.

9 Claims, 3 Drawing Sheets

(56) References Cited

U.S. PATENT DOCUMENTS

| | | | |
|---|---|---|---|
| 2010/0323715 A1* | 12/2010 | Winters | G01S 5/0027 |
| | | | 455/456.1 |
| 2010/0330991 A1 | 12/2010 | Sydir | |
| 2012/0028650 A1* | 2/2012 | Cooper | G01S 5/0294 |
| | | | 455/456.1 |
| 2013/0115954 A1* | 5/2013 | Charbit | H04W 36/32 |
| | | | 455/437 |
| 2013/0217414 A1* | 8/2013 | Nagaraj | H04W 84/005 |
| | | | 455/456.2 |

\* cited by examiner

METHOD FOR OPERATING A CELLULAR RADIO NETWORK

TECHNICAL FIELD

The present invention relates to a method for operating a cellular radio network, especially for controlling a registering of a user equipment at cells of the cellular radio network. The present invention relates furthermore to a network node and a user equipment implementing the method.

BACKGROUND ART

In wireless communication networks, for example cellular radio access networks, a network configuration and a cell assignment is based on quality metrics concerning for example a radio communication between a base station and a user equipment assigned to the base station. The quality metrics may be defined in specifications relating to the communication network, for example in the specifications of the 3rd Generation Partnership Project (3GPP). A typical metric may be for example a signal strength of a radio signal. The user equipment may constantly measure the metric by monitoring for example pilot symbols and may take appropriate actions, for example a reselection of a cell to camp on. How often the user equipment performs the measurement of the metrics may be based on network configuration and a reselection history of the user equipment. If many reselections have been done in the past, the user equipment may be defined as a high mobility user equipment and the metric measurements may be performed more often. Furthermore, as defined for example in the 3GPP specification 25.304, a hysteresis in the reselection algorithms may be implemented to some extent mitigate too many reselections and to minimize network traffic in the control plane. However, performing the metric measurements in the user equipment requires radio resource utilization and computing power which will reduce an operating time of the user equipment, especially in case the user equipment is a battery-powered mobile device. Furthermore, frequent cell reselections will increase network traffic in the control plane of the cellular radio network and may decrease an overall or individual data transmission capacity for user data in the cellular radio network.

Therefore, there is a need for an improved operation of a cellular radio network, especially in the area of the assignment of a user equipment to a cell of the cellular radio network.

SUMMARY

According to the present invention, this object is achieved by a method for operating a cellular radio network, a method for operating a user equipment in a cellular radio network, a network node for a cellular radio network and a user equipment for a cellular radio network. The dependent claims define preferred and advantageous embodiments of the invention.

According to an aspect of the present invention, a method for operating a cellular radio network is provided. According to the method, predicted location information relating to a user equipment operated in the cellular radio network is determined. The predicted location information comprises a predicted future geographical location of the user equipment. A current and the predicted future geographical location of the user equipment may be determined based on sensors of the user equipment, for example a receiver for receiving signals of a global navigation satellite system or an acceleration or motion detector for determining a current position, current speed and/or a current moving direction of the user equipment. In other embodiments, the current and predicted future geographical location of the user equipment may be determined using network based positioning methods or by obtaining data from servers providing positioning information. Based on the current and predicted location information, a control information is determined by the network. The control information is used to control a registering of the user equipment at cells or base stations of the radio access network. Furthermore, based on the predicted future location, the cellular radio network may plan ahead and optimize network resource utilization. Especially, for example handovers between cells may be reduced, and thus network traffic in the control plane of the cellular radio network may be reduced.

According to an embodiment, the control information is transmitted from a base station of the cellular radio network to the user equipment. For example, the control information may comprise a cell information defining at least one cell of the cellular radio network to be preferably used by the user equipment, when the user equipment performs a cell selection. In other words, the control information may comprise for example a list of cells or cell identifiers or base station identifiers of base stations related to cells from which the user equipment may select when the user equipment is leaving the cell in which it is currently registered. Taking into account the predicted location information of the user equipment, this list of preferred cells may contain only those cells which are located in the moving direction of the user equipment. Therefore, the number of cells to be monitored by the user equipment may be reduced, as cells from which the user equipment is moving away from need not to be monitored. Furthermore, the control information may comprise for example a monitoring rate defining a rate for monitoring radio signals of the cellular radio network for a cell selection. Based on the predicted location information it may be determined if and when the user equipment has to register at another cell, e.g. because the user equipment is leaving the current cell. Based on this information the monitoring rate for monitoring potential new cells may be adapted and therefore less monitoring of for example the above-described metrics, like signal strength, has to be performed by the user equipment. This may reduce the power consumption of the user equipment and may therefore prolong the operating time of a battery-powered user equipment.

As described above, the control information may be transmitted from the base station to the user equipment and evaluated at the user equipment for selecting an appropriate cell or for adjusting the monitoring rate. However, the control information may furthermore be transmitted to base stations adjacent to the cell in which the user equipment is currently registered. The control information may instruct an adjacent base station to accept a request for registering from the user equipment or to reject the request. This may be advantageously used to avoid frequent handovers taking into account the future location of the user equipment or a route the user equipment will presumably travel in the future.

According to an embodiment, the predicted location information may be determined by receiving from a server a travelling route which is determined for the user equipment. Based on the travelling route the predicted location information may be determined. When the user equipment, for example a mobile phone or a so-called smartphone, is connected to an internet service providing a routing service for travelling from a current position to a selected destination, the travelling route determined for the user equipment in the server may be shared with the cellular radio network, for example a network node or a server providing control plane services for the cellular radio network, and the travelling route may be used to predict future locations of the user equipment. Based on the future locations, the above-described cell information and monitoring rates may be determined and used for registering the user equipment at cells of the cellular radio network. However, the travelling route may be determined by an application running on the user equipment as well and may be transmitted from the user equipment to the cellular radio network for determining the predicted location information. Based on this the control information for controlling the registering of the user equipment at cells of the cellular radio network may be determined.

According to a further embodiment, the travelling route is determined based on a destination information entered by a user of the user equipment. The travelling route may be determined by a server or by an application executed on the user equipment and may further consider maps provided at the server, in the internet or on the user equipment. As an alternative, historical travelling routes of the user equipment may be used to determine a travelling route as will be described in the following. For example, when the user is travelling each day from Monday till Friday in the morning from home to work, it may assumed that, when the user equipment is located in the morning on this travelling route, the user is travelling to work like in the past. Based on this information a future location of the user equipment may be predicted, for example based on a route recorded in the past or based on a route calculated to the working place as the destination of the route.

However, according to another embodiment, the predicted location information may be determined by receiving from the user equipment a current location of the user equipment and a current moving direction in which the user equipment is moving. Furthermore, a current speed of the user equipment may be received from the user equipment and considered for predicting the location of the user equipment in the future. The current location of the user equipment may be determined with sensors or methods known in the art, for example by receiving signals from a global navigation satellite system or by receiving signals from base stations of the cellular radio network. The moving direction may be determined by corresponding motion or acceleration sensors of the user equipment or by monitoring a series of current locations and estimating a current moving direction from the changes in the current location. As location information and movement information are available in many user equipments, for example mobile phones, the predicted location information can be determined at low effort. Furthermore, by using pure location and movement information the method may be used also when the user equipment is used in an off road environment.

According to another aspect of the present invention, a method for operating a user equipment is provided. The user equipment is configured to communicate with a cellular radio network. According to the method, control information is received at the user equipment. The control information controls a registering of the user equipment at the cells of the cellular radio network and is determined depending on a predicted location information comprising a predicted future location of the user equipment. In other words, the predicted future location of the user equipment is used to determine the control information which is received by the user equipment. The control information may comprise for example a cell information, for example in form of a list of cells, defining cells of the cellular radio network to be preferably used by the user equipment, when the user equipment performs a cell selection. The list of cells is set up taking into account the future location of the user equipment. For example, cells from which the user equipment is moving away are not included in the list and cells near the future location of the user equipment are included. Furthermore, the control information may comprise a monitoring rate which defines a rate with which the user equipment monitors radio signals of the cellular radio network for finding a cell for a next cell registration. Based on the received control information the user equipment performs the cell selection. By considering the control information for the cell selection, the user equipment may reduce its power consumption as the monitoring rate can be lowered and a smaller number of cells has to be monitored.

According to an embodiment, the method comprises furthermore the steps of predicting the future location of the user equipment and transmitting the predicted location information to the cellular radio network. The future location of the user equipment may be predicted by the user equipment by determining a travelling route of the user equipment and by predicting a future location based on the determined travelling route. For example, when a user of the user equipment uses a routing functionality of the user equipment for planning a travelling route from a current position to a destination, this planned travelling route may be used to determine future locations of the user equipment.

According to another embodiment, a current location information of the user equipment is determined, for example by means of a sensor for receiving signals of a global navigation satellite system, and a current moving direction in which the user equipment is moving is determined, for example by means of an acceleration sensor arranged in the user equipment. Furthermore, a current speed of the user equipment may be determined. The current location information, the moving direction and/or the current speed are transmitted from the user equipment to the cellular radio network. Based on the current location, the moving direction and/or the current speed of the user equipment the above-described control information may be determined in the cellular radio network, for example in a network node of the cellular radio network or in a server controlling a so-called control plane of the cellular radio network. The determined control information may be sent to the user equipment and used for selecting a cell or for monitoring radio signals of the cellular radio network. Furthermore, the control information may be used by the cellular radio network for rejecting or accepting requests from the user equipment for registering at the base stations.

According to another aspect of the present invention, a network node for a cellular radio network is provided. The network node comprises for example a base station of the cellular radio network or a central network node providing for example control plane services for the cellular radio network. The network node comprises an interface for receiving predicted location information relating to a user equipment served by the cellular radio network. The predicted location information comprises a predicted future location of the user equipment. The processing device is configured to determine control information depending on the predicted location information and to control a registering of the user equipment at cells of the cellular radio network based on the control information. For controlling the registering, the network node may send the control information to the user equipment and the user equipment may use this control information as explained above for selecting a cell of the cellular radio network at a cell change or for monitoring radio signals of the cellular radio network. Additionally or as an alternative, the control information may be sent to base stations of the cellular radio network and used by the base stations for accepting or rejecting requests from the user equipment, when the user equipment is trying to register at the base stations of the cellular radio network. Therefore, the network node is configured to perform the above-described method and comprises therefore the above-described advantages.

According to another aspect of the present invention, a user equipment for a cellular radio network is provided. The user equipment comprises a wireless radio interface for wireless communication with a base station or a cell of the cellular radio network. The user equipment comprises furthermore a processing device which is configured to receive control information from for example a base station of the cellular radio network at which the user equipment is registered. The control information controls a registering of the user equipment at cells of the cellular radio network. The control information is determined depending on a predicted location information of the user equipment which defines a predicted future location of the user equipment. Based on the received control information the user equipment performs a cell selection. As an alternative or additionally, the user equipment may configure a monitoring rate for monitoring radio signals of the cellular radio network based on the received control information. Thus, the user equipment is configured to perform the above-described method and comprises therefore the above-described advantages.

Although specific features described in the above summary and the following detailed description are described in connection with specific embodiments and aspects of the present invention, it should be understood that the features of the embodiments and aspects may be combined with each other unless specifically noted otherwise.

BRIEF DESCRIPTION OF DRAWINGS

The present invention will now be described in more detail with reference to the accompanying drawings.

DESCRIPTION OF EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
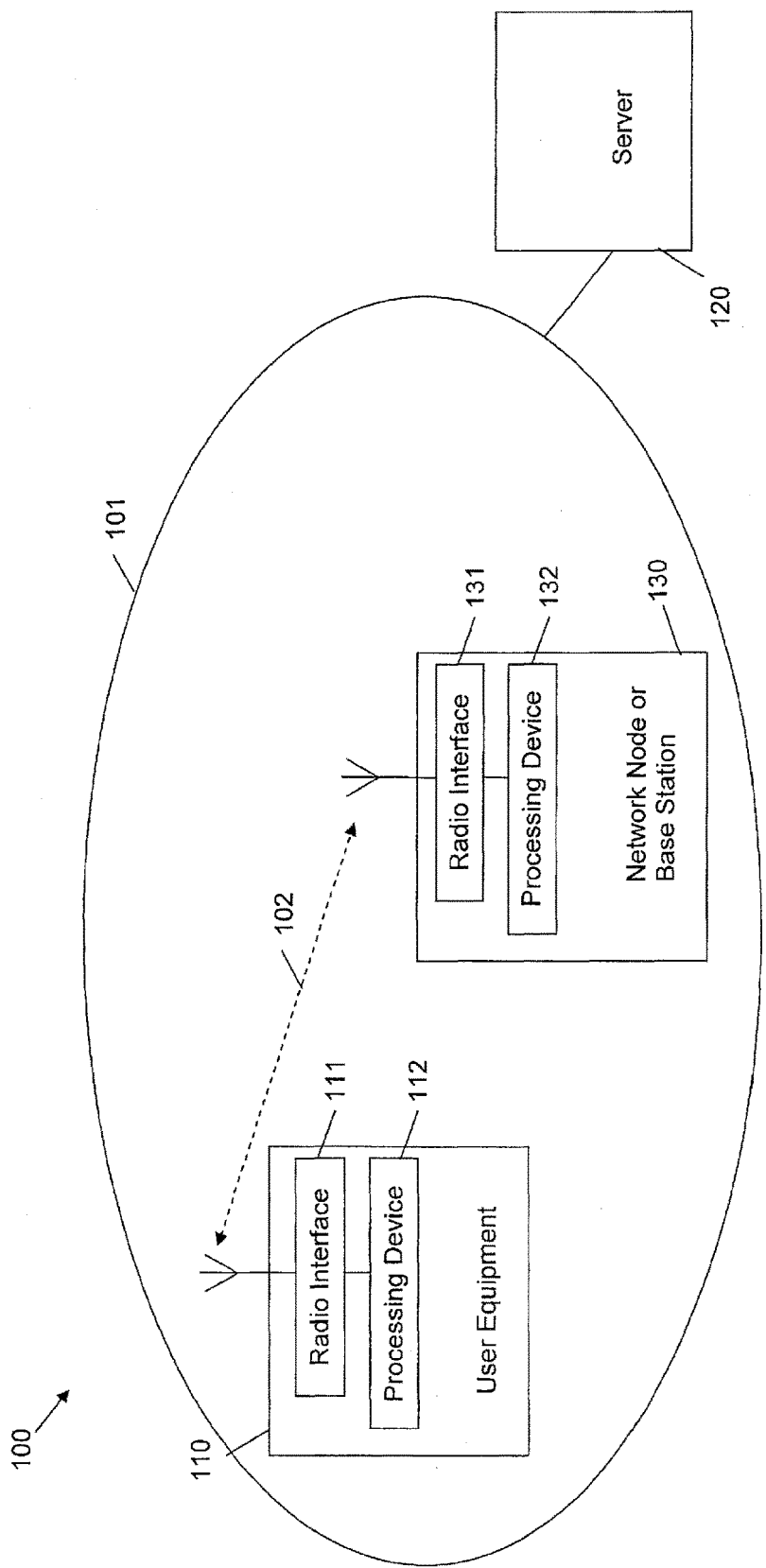
FIG. 1 shows a wireless communication system comprising a user equipment according to an embodiment of the present invention and a network node according to an embodiment of the present invention.

FIG. 1 shows a wireless communication system 100, for example a cellular-based wireless radio telecommunication network. The communication system 100 may comprise a plurality of network nodes, e.g. base stations or nodes providing network functions like a control plane function. One of these network nodes is shown as base station 130 in FIG. 1. To each base station a so-called radio cell is assigned. Radio cell 101 shown in FIG. 1 is assigned to the base station 130. A user equipment 110, which is also called terminal equipment and which may comprise for example a mobile phone, a personal digital assistant, a tablet computer or a notebook computer, may be arranged within the cell 101 and may register at the base station 130. By registering at the base station 130 the user equipment 110 may be served by the base station 130 with data communication. The data communication may be used for voice transmissions or data transmissions, for example for downloading music or videos or for browsing the internet. The wireless communication network 100 may be coupled to a server 120 provided in a wireless or a wired communication network, for example in the internet.

The user equipment 110 comprises a wireless radio interface 111 and a processing device 112. The processing device 112 may comprise for example a microprocessor or a controller for executing software or applications stored in the user equipment 110. The user equipment 110 may comprise more components, for example a display, a microphone, a loudspeaker, a battery, and input means, but these components are not shown for clarity reasons. The base station 130 comprises a wireless radio interface 131 and a processing device 132. In a cell-based communication system like the system 100, the user equipment 110 registers at the base station 130 and a radio link 102 is established for a data communication between the base station 130 and the user equipment 110. When the user equipment 110 wants to set up a data communication to a desired communication partner, for example a voice communication to another user equipment or a data communication to the server 120, the data is communicated via the radio link 102 between the user equipment 110 and the base station 130, and the base station 130 establishes a further communication to the desired communication partner. When the user equipment 110 is geographically moving around, the user equipment 110 may leave the cell 101. In this case, the user equipment 110 has to register at another base station providing another cell. Accordingly, the communication network 100 rearranges a network configuration for routing communication data from the user equipment 110 to a desired base station. Network configuration and cell assignment may be based on quality metrics defined for the communication network. A typical metric is the signal strength of the radio signal of the radio link 102. The user equipment constantly measures the metric by monitoring corresponding pilot symbols provided by the base stations and reports back to the base station and takes appropriate actions, for example initiate reselection of a cell. How often the user equipment performs the metric measurement may depend on the network configuration and the history of the selections in the past. Additionally, as will be described in the following, the cell selection and the rate for monitoring the metrics may be controlled based on a predicted geographical location of the user equipment 110.

Available sensors in the user equipment 110 may provide location information of the user equipment to the cellular radio network 100 enabling more intelligent network and cell utilization. Furthermore, in some cases, the user equipment 110 may have a planned route, which may be determined based on navigation tools or behavior prediction engines provided in the user equipment 110 or in a server 120 coupled or assigned to the user equipment 110. The planned route may additionally or as an alternative provide information to the cellular radio network 100 enabling the more intelligent network and cell utilization.

Figure 3:
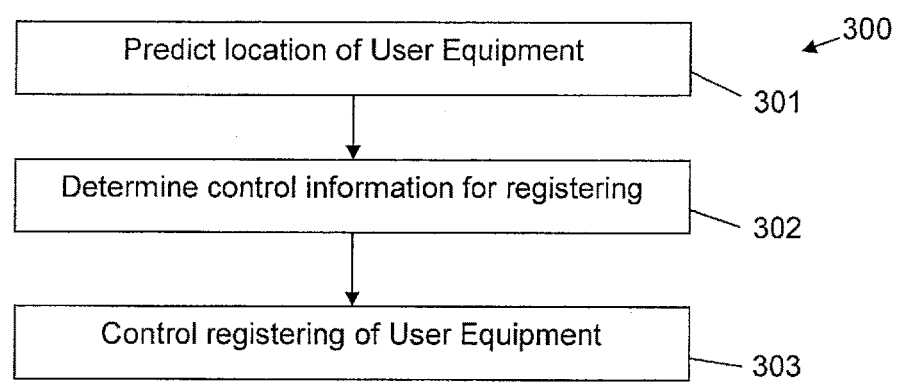
FIG. 3 shows a flowchart comprising method steps according to an embodiment of the present invention.

FIG. 3 shows a method 300 for operating the cellular radio network 100. In step 301 a future geographic location of the user equipment 110 is predicted. In step 302 control information enabling the more intelligent network and cell utilization is determined. The control information may be especially used for registering the user equipment 110 at cells 101 of the cellular radio network 100 as will be explained in more detail below. In step 303 registering of the user equipment 110 is controlled based on the determined control information.

When the user equipment 110 sends predicted location information or a navigation route to the cellular radio network 100, this may enable the cellular radio network 100 to determine required signaling and reporting for the route by analyzing the predicted location information or route information combined with knowledge about the network configuration, topology and utilization. The network may further use predicted location information or routing information for multiple user equipments to predict traffic patterns and adapt signaling and reporting to optimize the network performance, for example to achieve an adequate level of load balancing. The above-mentioned configuration information or control information determined by the network 100 is sent to one or more user equipments 110 of the network 100. The information may apply to the entire route or to one or several segments thereof or to only the predicted future location. Based on this control information, the user equipment 110 adapts its signaling and handover schemes and associated measurements, for example a signal strength measurement of neighboring cells.

The user equipment 110 may report progress to the route, for example a current position and a velocity, and may report deviations from the reported route to the network 100 or the server 120. This will be considered by the network 100 for a continuous network planning and reconfiguration. Based on the updated progress the network 100 may decide to update the configuration and control information for the user equipment 110. The data used by the network 100 may reside in either the user equipment 110 or in the network 100 or on server 120, or in all of them. An application generating the control information may also be located in either place.

In connection with FIG. 2 an exemplary scenario of a user equipment travelling from a starting point 201 to a destination 202 along a planned route 203 will be described in more detail. Cells 101A-101I of a cellular radio network 100 are indicated by corresponding circles in FIG. 2. Based on the route 203, the cellular radio network 100 knows that cell 101G is the destination cell. Furthermore, only cells 101B, 101D, 101E, 101F and 101G are interesting for cell changes when the user equipment 110 is travelling along the planned route 203. Therefore, there is no need to monitor cells 101A, 101C, 101I and 101H, although these are neighboring cells. The cellular radio network 100 may adapt a list of cells to be monitored by the user equipment 110 such that the user equipment 110 monitors only cells 101B, 101D, 101E, 101F and 101G. Furthermore, as the cellular radio network 100 knows that cell 101G is the destination cell, the list of monitored cells provided to the user equipment can be further reduced by removing cells 101E and 101F. Therefore, the number of cells monitored by the user equipment may be significantly reduced and also the number of handovers or cell changes may be reduced as cell changes into cells 101E and 101F may be avoided.

Figure 2:
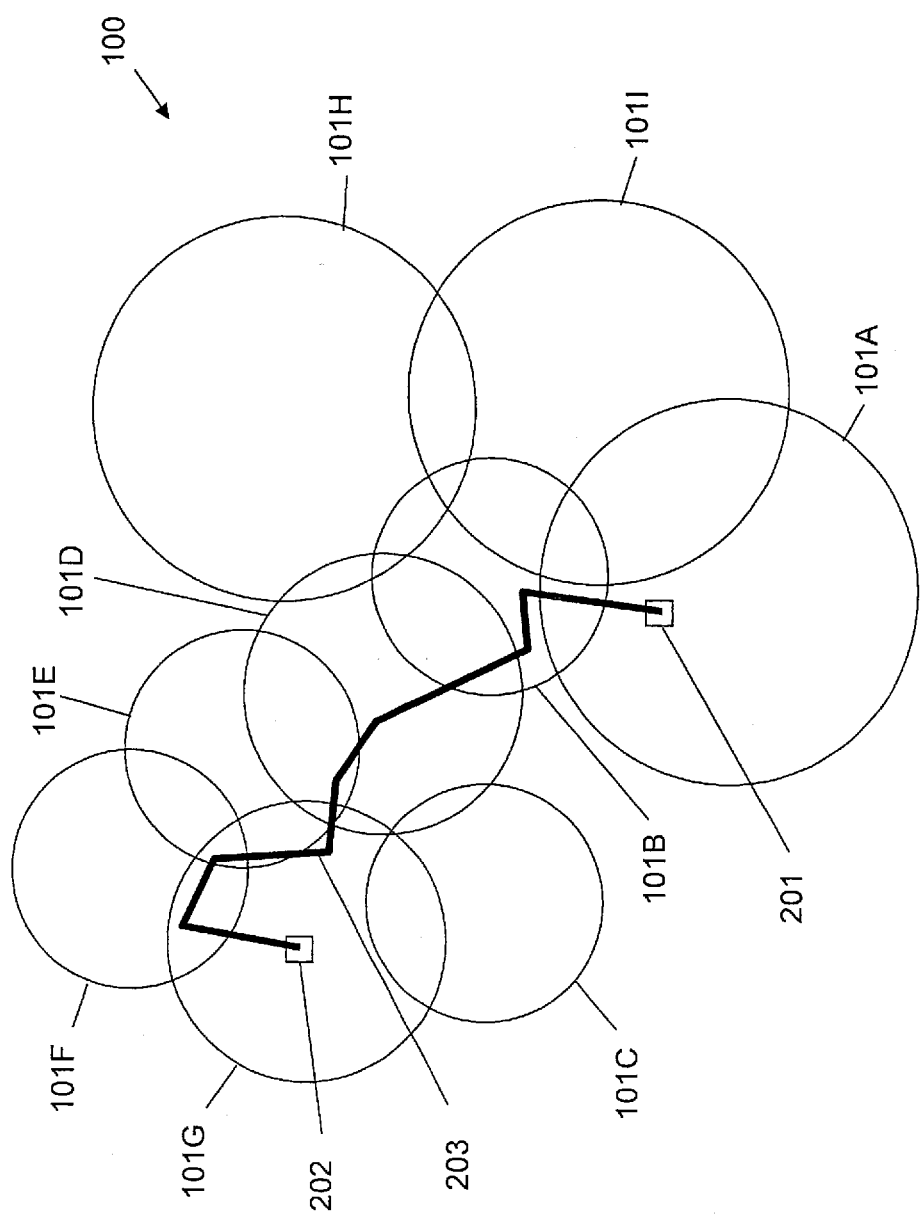
FIG. 2 shows a wireless communication system and a travelling route of a user equipment.

In other words, in the example shown in FIG. 2, the user equipment 110 travelling along the planned route 203 would be moving along an area of cells 101E and 101F that normally would trigger a handover or reselection of the cell to camp on. Hence, if the route 203 reveals that the user equipment 110 will turn back into cell 101G and will never loose contact completely to cell 101G, handovers to cells 101E and 101F may not be optimal. If the cellular radio network 100 knows the future locations of the user equipment 110 along the route 203, no handover to cells 101E and 101F would be initiated. Thus, the control traffic can be lowered and the user equipment 110 may save power. Furthermore, this behavior may be combined with for example hysteresis algorithms which are already part of the 3GPP specification. Furthermore, in this scenario, a temporary antenna beam forming may be more efficient from a overall capacity point of view. Additionally, the route information concerning route 203 may be used to minimize the table of neighboring cells to be monitored by the user equipment 110. Monitoring cells from which the user equipment 110 is moving away from does not provide useful data for the network 100 or the user equipment 110, and may thus be excluded from further monitoring.

The route 203 from the starting point 201 to the destination 202 may be determined by an application of the user equipment 110. However, the route 203 may also be determined by an external service, for example by server 120. The so-called Network Function Virtualization (NFV) initiative in ETSI proposes to provide Application Programming Interfaces (APIs) to provide the network with information from external services. One such API could be common to navigation services. The cellular radio network 100 may then obtain navigation data from external services, for example Google Maps, directly using this API and only a few additional parameters are needed from the user equipment 110. Based on the determined route, control information for controlling the network 100 and the user equipment 110 as described above may be determined.

The invention claimed is:

1. A method for operating a cellular radio network, the method comprising:
   determining, by the cellular radio network, predicted location information relating to a user equipment, the predicted location information comprising a predicted future location of the user equipment,
   determining, by the cellular radio network, control information depending on the predicted location information, and
   controlling, at one or more nodes of the cellular radio network or at the user equipment, a registering of the user equipment at cells of the cellular radio network based on the control information,
   wherein determining the predicted location information comprises:
   receiving, from a server outside of the cellular radio network, a planned travelling route determined for the user equipment, at a routing node or a control plane service of the cellular radio network, and
   determining, by the routing node or the control place service, the predicted location information based on the planned travelling route.

2. The method according to claim 1, further comprising: transmitting the control information from a base station of the cellular radio network to the user equipment.

3. The method according to claim 1, wherein the control information comprises at least one of a group consisting of:

cell information defining at least one cell of the cellular radio network to be preferably used by the user equipment, when the user equipment performs a cell selection, a monitoring rate defining a rate for a monitoring of radio signals of the cellular radio network for a cell selection based on the monitoring, and a monitoring rate defining a rate for a monitoring of radio signals of the cellular radio network that depends on the user equipment's location.

4. The method according to claim 1, wherein the planned travelling route is determined based on at least one of a group consisting of:

destination information obtained from the user equipment, and historical travelling routes of the user equipment.

5. The method according to claim 1, wherein determining the predicted location information further comprises at least one of a group consisting of:

receiving from the user equipment a current location of the user equipment and a current moving direction in which the user equipment is moving, and receiving from the user equipment a current speed of a movement of the user equipment.

6. A method for operating a user equipment, the user equipment being configured to communicate with a cellular radio network, the method comprising:

receiving control information at the user equipment from a network node of the cellular radio network, wherein the control information controls a registering of the user equipment at cells of the cellular radio network and is determined depending on a predicted location information comprising a predicted future location of the user equipment, performing, by the user equipment, a cell selection based on the received control information, predicting, by the user equipment, the future location of the user equipment, and transmitting, from the user equipment, the predicted location information to a routing node or a control place service of the cellular radio network, wherein predicting the future location of the user equipment comprises:

determining a planned travelling route of the user equipment, and predicting the future location based on the determined planned travelling route.

7. The method according to claim 6, further comprising:

determining a current location information of the user equipment and a current moving direction in which the user equipment is moving, and transmitting the current location information and the moving direction to the cellular radio network.

8. A network node for a cellular radio network, wherein the network node comprises a routing node or a control plane service of the cellular radio network, comprising:

an interface for receiving, from a server outside of the cellular radio network, a planned travelling route determined for a user equipment served by the cellular radio network at the routing node or the control plane service, and a processing device, configured to determine predicted location information based on the planned travelling route, to determine control information depending on the predicted location information, and to control a registering of the user equipment at cells of the cellular radio network based on the control information.

9. A user equipment for a cellular radio network, comprising:

a wireless radio interface for wireless communication with a base station of the cellular radio network, and a processing device, configured to determine a planned travelling route of the user equipment, to predict a future location of the user equipment based on the determined planned travelling route, to transmit the predicted location information to a routing node or a control plane service of the cellular radio network, to receive control information, wherein the control information controls a registering of the user equipment at cells of the cellular radio network and is determined depending on the predicted location information comprising a predicted future location of the user equipment, and to perform a cell selection based on the received control information.

* * * * *